(No Model.)

C. G. DE PERALTA.
GALVANIC BATTERY.

No. 441,967. Patented Dec. 2, 1890.

WITNESSES:
J. H. Clark.
E. M. Clark.

INVENTOR:
C. G. de Peralta
BY Munn & Co.
ATTORNEYS

UNITED STATES PATENT OFFICE.

CÁNDIDO GRAVE DE PERALTA, OF HAVANA, CUBA.

GALVANIC-BATTERY.

SPECIFICATION forming part of Letters Patent No. 441,967, dated December 2, 1890.

Application filed May 23, 1890. Serial No. 352,897. (No model.)

*To all whom it may concern:*

Be it known that I, CÁNDIDO GRAVE DE PERALTA, of Havana, Cuba, have invented a new and Improved Galvanic Battery, of which the following is a specification, reference being had to the annexed drawings, forming a part thereof, in which—

Figure 1:
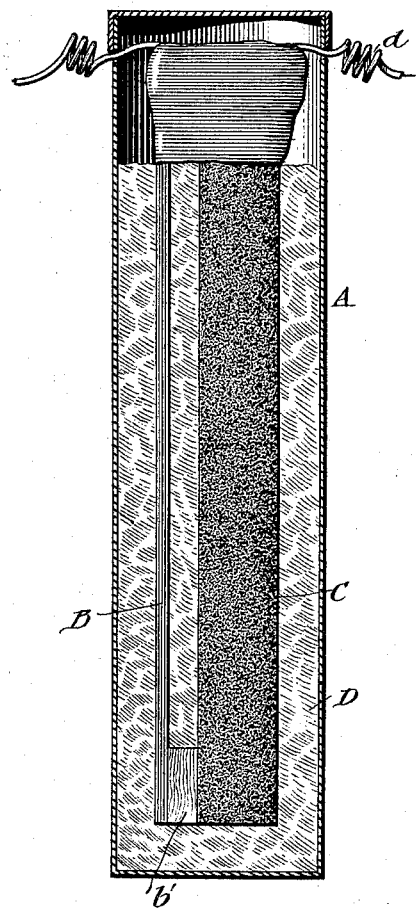
Figure 2:
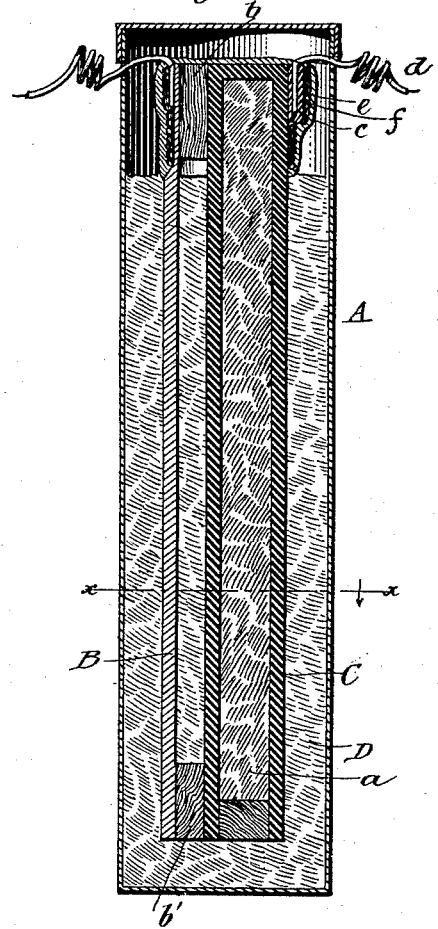
Figure 3:
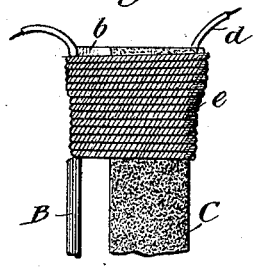
Figure 4:
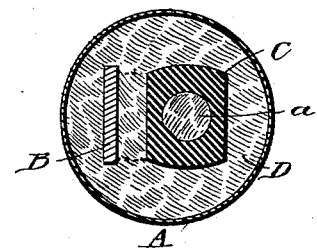

Figure 1 is a side elevation showing the can in section. Fig. 2 is a vertical transverse section. Fig. 3 is a sectional view showing the fastening of the zinc and carbon plates or rods, and Fig. 4 is a cross-section taken on line $x\,x$ in Fig. 2.

Similar letters of reference indicate corresponding parts in all the views.

My invention relates to the class of batteries known as "moist," "paste," or "dry" batteries.

The object of the invention is to construct a compact paste battery of inexpensive material of convenient form for telephonic, telegraphic, and other uses.

My invention consists in a battery formed of a containing-vessel, a pair of electrodes placed in the vessel, and a paste formed wholly or in part of electrolytic material.

In carrying out my invention I provide a receptacle made of any suitable material capable of resisting the action of chemicals, and of any desired form. In the present case I have made use of a tin can A, of suitable height and of small diameter; but I do not confine my improvement to any particular form or material, as this vessel may be made in the form of a figure, vase, or other ornamental object, or of glass or other material not acted upon by the electrolytic material, or it may be of wood, pasteboard, or other porous substance, rendered impervious to the paste by the application of a varnish, or by treatment with paraffine or analogous material. In this can I have placed zinc and carbon plates B C, and I partly or wholly fill the can with a body D of paste, which surrounds and separates the two plates B C. The carbon plate in the present case is provided with a central longitudinal cavity $a$, which is filled with a suitable agent—such as chloride of sodium, sulphate of nickel, or other sulphate, or a nitrate of silver, for example. The carbon and zinc electrodes are separated by blocks $b\,b'$ of insulating material. The upper end of the carbon electrode is saturated with paraffine, and a plate $c$, of platinum or other unoxidable material, is attached to the wire $d$, and is bound to the carbon electrode by the twine $e$, which also binds the carbon and zinc electrodes together upon the insulating-block $b$. A piece of soft rubber $f$ is interposed between the platinum plate $c$ and the twine wrapping. The twine is finally filled and covered with a suitable cement, such as sealing-wax.

The paste is formed either wholly of electrolytic material, or partly of electrolytic material and partly of an inert substance. One of the substances included in the paste must have a hygroscopic or deliquescent nature to maintain the paste in a moist condition. I have found in practice that a paste composed of wheat-flour and chloride of sodium is effective in the battery. With such a paste a current of high electro-motive force is obtained. With a paste containing bisulphate of mercury a current of large quantity is generated.

I have found in practice that any raw or cooked mass from fruit, vegetables, or grain, any animal substance, together with agents capable of generating electricity, form a paste which may be used in my improved battery. In lieu of the vegetable and animal matter I may employ a mineral substance, such as plaster-of-paris.

My improved battery, when not in action, remains permanent for a long time, and when in action it is effective for several hours' continuous use, and when partly polarized it will become depolarized during a short rest.

Having thus described my invention, I claim as new and desire to secure by Letters Patent—

In a galvanic battery, the combination of zinc and carbon electrodes separated by blocks of insulating material and bound together, as described, a metallic containing-vessel, and a paste containing an active and a deliquescent material surrounding the electrodes, substantially as specified.

CÁNDIDO GRAVE DE PERALTA.

Witnesses:
ANTONIO M. MOLINA,
EDWD. M. CLARK.